United States Patent [19]

McDermott et al.

[11] 4,246,252

[45] Jan. 20, 1981

[54] GAS GENERATING SYSTEM FOR CHEMICAL LASERS

[75] Inventors: William E. McDermott; David J. Benard; Nicholas R. Pchelkin; Ronald R. Bousek, all of Albuquerque, N. Mex.

[73] Assignee: The United States of America as represented by the Secretary of the Air Force, Washington, D.C.

[21] Appl. No.: 29,955

[22] Filed: Apr. 13, 1979

[51] Int. Cl.³ ............................................. C01B 13/02
[52] U.S. Cl. ................................ 423/579; 331/94.5 G
[58] Field of Search .......................................... 423/579

[56] References Cited

U.S. PATENT DOCUMENTS

| 3,882,414 | 5/1975 | Jeffers et al. | 331/94.5 G |
| 3,959,741 | 5/1976 | Meinzer | 331/94.5 G |
| 4,102,950 | 7/1978 | Pilipovich et al. | 423/579 |

OTHER PUBLICATIONS

Zalesskii, Sov. Phys., JETP, vol. 40, No. 1, pp. 14–17, (1975).

Primary Examiner—Earl C. Thomas
Assistant Examiner—Wayne A. Langel
Attorney, Agent, or Firm—Donald J. Singer; William J. O'Brien

[57] ABSTRACT

A method for generating electronically excited oxygen by effecting a chemical reaction between chlorine and basic hydrogen peroxide.

2 Claims, 1 Drawing Figure

U.S. Patent
Jan. 20, 1981
4,246,252
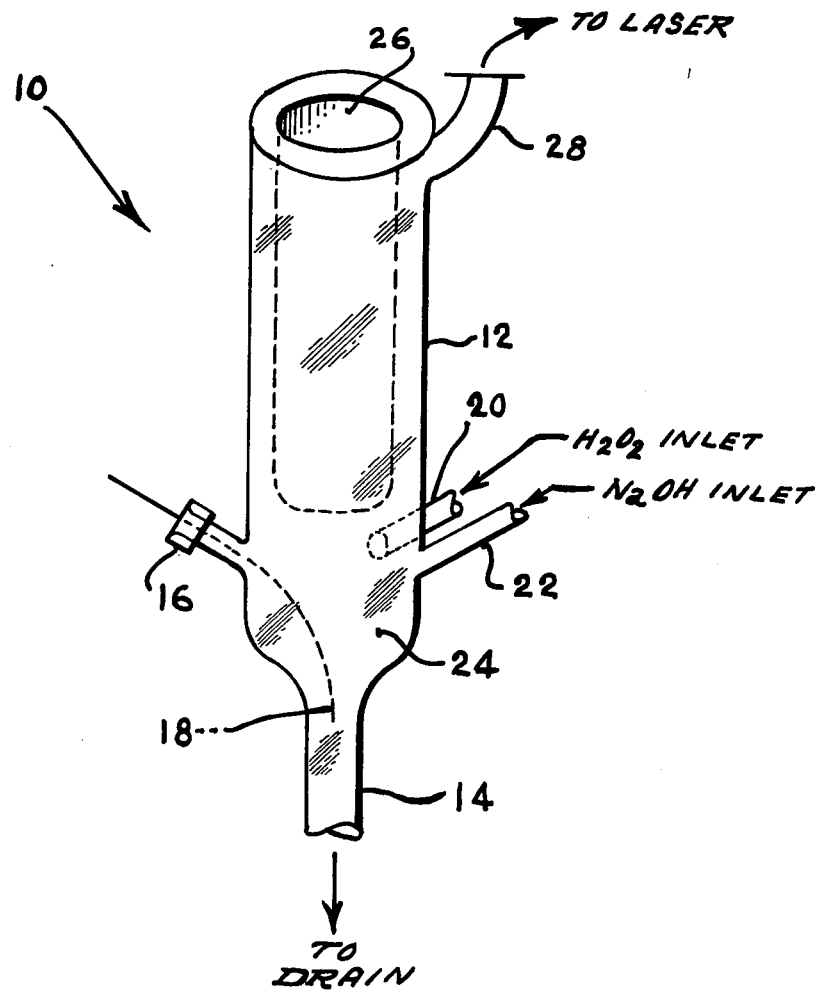

GAS GENERATING SYSTEM FOR CHEMICAL LASERS

STATEMENT OF GOVERNMENT INTEREST

The invention described herein may be manufactured and used by or for the Government for governmental purposes without the payment of any royalty thereon.

BACKGROUND OF THE INVENTION

This invention relates to chemical lasers and, more particularly, to a system for generating molecular oxygen in the excited singlet-delta electronic state.

The amplification of coherent electromagnetic radiation in the visible and infrared spectrum of the optical frequency range, generally referred to as lasing action, has generated considerable interest in various electronic disciplines. A laser produces a beam of coherent electromagnetic radiation having a well defined frequency in the optical range and, in addition to the visible and infrared spectrum, includes the ultraviolet spectrum. The coherence of the laser beam sets it apart and makes it distinguishable from ordinary light beams which are incoherent. The laser beam has a very small divergence and therefore, is highly directional. Also, its coherence feature makes it especially useful for communication and navigation applications since its frequencies are many times higher than radio frequencies thus permitting it to carry many times more information than a radio beam.

A number of systems and devices have been developed for producing a lasing action for use in heating, navigation and communication applications. These devices employ an optically active media, which may be either solid, liquid or gaseous, from which the laser beam is extracted by means of a phenomena called population inversion. The active media possesses unstable high energy states which can release photons as they decay to lower energy states. Also, there must be a greater number of higher energy states than lower energy states in the media.

Flowing gas systems are preferred for high energy laser devices and the requisite population inversion is accomplished by means of a chemical reaction. These so-called chemical lasers induce the lasing action by mixing a lasing substance, or optically active media with an electronically excited energizing gas and then directing a flow of the gaseous mixture into an optical laser cavity where the lasing action is generated. The lasing media and the electronically excited gas react chemically to provide the necessary population inversion and lifetime required to create the lasing action. For example, the photon emission necessary for laser operation can be achieved by the resonant transfer of energy, through collisions, between an energizing substance such as excited nitrogen and a lasing substance such as carbon dioxide. Other chemical lasing systems utilize hydrogen and fluorine to achieve a lasing action as well as mixtures of helium and carbon dioxide and mixtures of helium, nitrogen and carbon dioxide.

The chemical laser systems have proven to be very useful for a number of applications and considerable interest in their development has evolved, especially in the area of materials supply. The attendant problems associated with preparing, storing, maintaining and delivering the requisite reactant gases has hindered the application of chemical lasers for military and airborne applications.

In attempting to find solutions to the problems of providing simple, efficient and dependable sources of electronically excited energizing gases for chemical lasers, it has been found that a chemical reaction between chlorine gas and a basic solution of hydrogen perioxide will generate a stream of molecular oxygen in the excited singlet-delta electronic state. The excited oxygen can then be added to a suitable lasing medium and the mixture passed through an optical resonator to bring about a lasing action.

SUMMARY OF THE INVENTION

In accordance with this invention, it has been found that molecular oxygen in the electronically excited singlet-delta electronic state, $O_2('\Delta)$, can be generated by a method which involves flowing chlorine gas through a basic solution of 90% $H_2O_2$. The resulting excited oxygen is suitable for use as the energizing, optically active media reactant for effecting population inversion in a laser by means of a chemical reaction. The reaction is brought about by mixing the effluent from the oxygen generator with a lasing substance at the entrance of an optical laser cavity. At that point, the lasing substance becomes dissociated by the excited oxygen resulting in the production of a lasing action.

The use of this invention aids in solving the problem of providing adequate amounts of an energizing gas in an efficient and economical manner. It provides a system for effecting a continuous wave, chemically pumped lasing action by direct chemical reaction between gaseous components.

Accordingly, the primary object of this invention is to provide a method for preparing a electronically excited gaseous medium for use as an energizing reactant in chemical lasers.

Another object of this invention is to provide a method for generating molecular oxygen in the excited singlet-delta electronic state.

Still another object of this invention is to provide a simple, dependable, efficient and economical method for preparing electronically excited oxygen for use as an energizing medium for continuous-wave, chemically pumped lasers.

The above and still other objects and advantages of the present invention will become more readily apparent upon consideration of the following detailed disclosure thereof when taken in conjunction with the accompanying drawing.

DESCRIPTION OF THE DRAWING

In the drawing:

The FIGURE is a simple, schematic representation showing a generator suitable for use in preparing the electronically excited oxygen energizing gas of this invention.

DESCRIPTION OF THE PREFERRED EMBODIMENT

Pursuant to the above-identified objects, the present invention concerns itself with a gas generating system for producing an energizing gaseous reactant for use in chemical lasers. The system involves effecting a reaction between chlorine gas and a basic solution of hydrogen peroxide to generate a stream of molecular oxygen in the excited singlet-delta electronic state. The $O_2('\Delta)$ gaseous flow or effluent from the generator can then be added to the flow of a gaseous lasing substance to form a lasing mixture. The flowing mixture can then be directed into a suitable optical cavity or resonator to produce a lasing action.

With reference to the FIGURE in the drawing, there is shown a gaseous generator 10 comprising an elongated glass tube 12 with a constricted end 14 which is connected to a suitable drain not shown. A gaseous inlet means 16 connects to a gas bubbler 18 for introducing a gaseous reactant. Inlet means 20 and 22 are also provided for the introduction of reaction components into the reaction zone 24 of the tube 12. A cold finger 26 comprising a dry ice-ethanol bath is positioned within the tube 12 upstream from the reaction zone 24 and adjacent to exit means 28 which in turn can be directly connected, if desired, to a lasing apparatus not shown.

The preparation of the $O_2\,('\Delta)$ gas of this invention is very straight forward. About 200 ml 90% hydrogen peroxide is admitted into the reaction zone 24 of the generator 10 through inlet means 20 while 100 ml of 6 N sodium hydroxide are being admitted through inlet means 22. Chlorine gas is admitted through inlet 16 and chlorine bubbler 18 made from $\frac{1}{8}''$ nylon tubing that was heat sealed and provided with several pin holes near the end of bubbler 18. As shown in the drawing, the bubbler 18 rests near the bottom of the reaction zone 24. The flowing chlorine from bubbler 18 reacts chemically with the hydrogen peroxide in the presence of the sodium hydroxide to produce the electronically excited oxygen of this invention. The cold finger 26 is filled with a dry ice-ethanol bath to trap water and other high melting point reaction byproducts. Chlorine is admitted at a flow rate of about 100 standard $cm^3 sec^{-1}$ and about 1 torr of oxygen is produced with an $O_2\,('\Delta)$ concentration greater than 40%. After the oxygen exits from the top of the generator through exit means 28, it flows through a conventional $-154°$ C. cold trap (Freon 22-liquid nitrogen) to remove chlorine prior to use of the excited oxygen in a laser.

While the present invention has been described with particularity in reference to a specific embodiment thereof, it is to be understood that the disclosure of the present invention is for the purpose of illustration only and is not intended to limit the invention in any way, the scope of which is defined by the appended claims.

What is claimed is:

1. A method for preparing molecular oxygen in the excited single-delta electronic state for use as an energizing reactant for chemical lasers which consists essentially of the steps of:
   (A) introducing a mixture consisting essentially of 200 ml of 90% hydrogen peroxide and 100 ml of sodium hydroxide into the reaction zone of a gas generator;
   (B) admitting chlorine gas into said reaction-zone and allowing said gas to flow through said hydrogen peroxide mixture at a flow rate of about 100 standard $cm^3 sec^{-1}$ to effect a chemical reaction therebetween;
   (C) passing the product of said chemical reaction through a low temperature zone to remove water and other high melting point reaction by products; and
   (D) removing and storing the resulting vibrationally excited oxygen.

2. A method in accordance with claim 1 wherein said excited oxygen is produced in the amount of about one torr with a singlet-delta concentration greater than 40%.

* * * * *